W. JAMESON.
APPARATUS FOR MAKING STRAND FABRIC.
APPLICATION FILED JAN. 7, 1922.
Reissued May 9, 1922.
15,349.
Fig. 5.
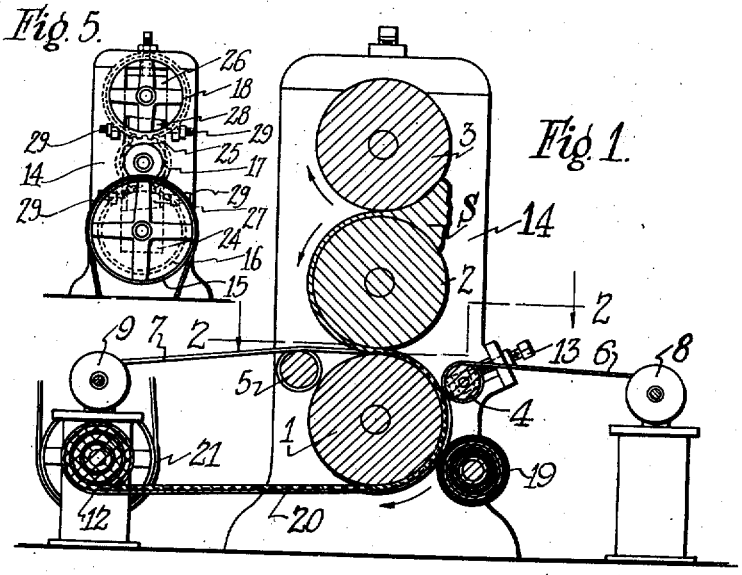
Fig. 1.
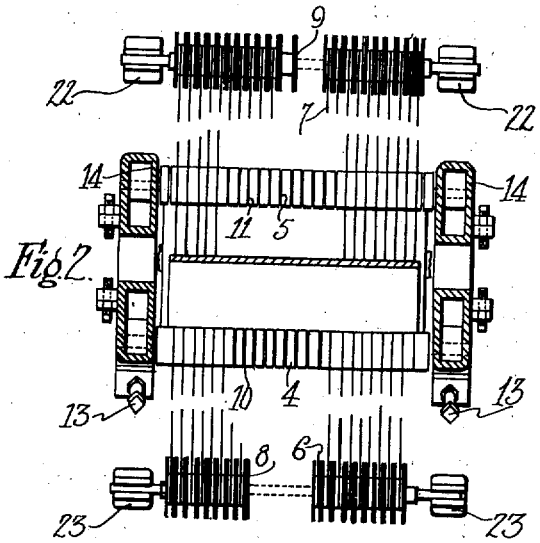
Fig. 2.
Fig. 4.
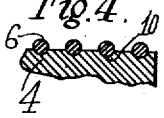
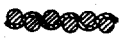
Fig. 3.
INVENTOR
William Jameson.
BY Edward C. Taylor
ATTORNEY

UNITED STATES PATENT OFFICE.

WILLIAM JAMESON, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR MAKING STRAND FABRIC.

15,349. Specification of Reissued Letters Patent. Reissued May 9, 1922.

Original No. 1,327,826, dated January 13, 1920, Serial No. 268,633, filed December 28, 1918. Application for reissue filed January 7, 1922. Serial No. 527,774.

*To all whom it may concern:*

Be it known that I, WILLIAM JAMESON, a citizen of the United States of America, residing at Springfield, in the county of Hampden and State of Massachusetts, have invented certain new and useful Improvements in Apparatus for Making Strand Fabric, of which the following is a specification.

My invention relates to the manufacture of rubber sheets with strands embedded therein, and more particularly to apparatus for making strand fabric.

In the making of pneumatic tire casings, commonly called "tires" there is frequently used material comprising a sheet of tacky unvulcanized rubber with parallel strands, generally in the character of cords, embedded therein, the rubber holding the strands together to form a sheet of what may be termed "strand fabric." I have devised an apparatus for the manufacture of such material, and material of similar character.

One object of my invention is to provide an apparatus of the character indicated by which sheets with strands embedded therein may be produced rapidly and inexpensively.

Another object is to provide an apparatus for the manufacture of material of the character indicated, in which material successive strands are embedded in opposite sides of the sheet.

To these ends, and also to improve generally upon devices of the character indicated, my invention consists in the following matters hereinafter described and claimed.

Without restricting my invention thereto, I describe it by reference to the apparatus illustrated in the accompanying drawings; and in these drawings—

Figure 1 is a central elevational section of an apparatus embodying my invention, the strand supplying spools not, however, being shown in section, but merely in side elevation; and the depths of the strand-grooves in the pressing roller being exaggerated as compared to Fig. 4, and the strands, as fed by such roller, upstanding from the sheet, as compared to Fig. 3, the clearer to illustrate the invention.

Fig. 2 is a section substantially on the line 2—2 of Fig. 1, with the strands broken out, and the strand supplying spools (with the major portions of their supports omitted) moved toward the calender machine, to save space, and the driving means, the adjustable mounting for the rolls, liner drum, and the drum for the product, all being omitted to avoid confusion;

Fig. 3 is an enlarged cross-section of the fabric produced by the illustrated apparatus when the parts are arranged for maximum embedment;

Fig. 4 is a fragmental view of a grooved roller and a few of the strands; and

Fig. 5 is a side elevation showing the mounting of the calender rolls.

In general, the illustrated apparatus comprises three superposed calender rolls 1, 2 and 3, these rolls being positively driven, at such relative surface speeds as desired. Arranged, each at a respective side of the lower roll 1, are strand-guiding means exemplified by rotatable elements, or rollers, 4 and 5, each arranged to receive a series of strands, generally cords, as 6 and 7 from supply means, as the series of spools 8 and 9. Each of these rollers is provided on its surface with a series of strand-guiding grooves, as 10 and 11, and the grooves of one roller are staggered with respect to those of the other.

In operation: the stock S of unvulcanized rubber is fed between the rolls 2 and 3 and calendered into a sheet. This sheet is then carried, by the roll 2, between the rolls 1 and 2, and then wound upon the drum 12. The strands 7 are fed to the lower side of the freshly formed sheet to lie between the sheet and the surface of the roll 1. Here they are embedded in the sheet by the pressure between rolls 1 and 2, the exact amount of the embedment depending upon the amount of the pressure, which may be regulated by any suitable adjusting means, as hereinafter described. Preferably, and also as hereinafter described, there are provided means for adjusting the pressure between the rolls 2 and 3 to regulate the thickness of the sheet. The strands 6 are led to the upper surface of the sheet and embedded therein to the extent desired. With the drum 12, roll 1 and roller 4 in relative positions substantially as shown, a certain embedment of the strands 6 will of course occur. But, preferably, and as shown, the roller 4 is arranged to directly cooperate with the roll 1 to press the stock and strands 6 therebetween, and so embed the strands 6. Again, the roller 4, cooperating with the roll 1 acts to supplement the embedding action of the rolls 1 and 2 on the strands 7. The amount of the pressure between the rolls 1 and 4 may be regulated in any desired manner, as by mounting the roller 4 with an adjustable-journal-block construction 13, for adjustment to and from the roll 1, for each journal.

It will be seen that the illustrated apparatus provides means for embedding strands in rubber in staggered relation, for adjusting the thickness of the sheet, and for adjusting the amount of embedment of either or both series of strands. By pressing the strands against the rubber while the latter is in a freshly worked condition the embedment of the strands in the rubber can be accomplished much more readily and accurately.

Although I have exemplified the guiding means for the strands by the grooved rollers 4 and 5, rather than by reeds or the like, it will be understood that I do not restrict my invention to the use of grooved rollers as a guiding means.

It will also be understood that when it is desired that the roller 4 shall act, not only as a pressure roll to press the rubber about the strands 7, but also as a means for pressing the strands 6 into the sheet, the grooves 10 are desirably, and as illustrated (Fig. 4) of any desired less depth than the diameter of the strands.

As to details: The machine comprises the upright frame members 14, 14, in which are rotatably mounted the rolls 1, 2, and 3, the roll 1 being driven in any suitable manner conventionally indicated by the pulley 15 and the rolls 2 and 3 receiving motion from the roll 1 through the gears 16, 17, and 18. The frame members also rotatably support the rollers 4 and 5 and the drum 19 for the supply of "liner" 20 to lie between the layers of the finished fabric wound upon the drum 12. The drum 12 may be driven at decreasing speed as the diameter of the fabric increases, in any suitable manner; as by the pulley 21. The standards 22, 22, and 23, 23 at each side of the roller-carrying frames 14, 14 rotatably support the spools 8 and 9.

As indicated in Fig. 5, the means for moving the rolls 1 and 2 relatively toward and from each other, and the means for similarly relatively moving the rolls 2 and 3, may comprise a system of adjustable journal blocks (duplicated at each side of the machine) for carrying the rolls 1, 2, and 3. The block 24, carrying the roll 1, the block 25, carrying the roll 2, and the block 26, carrying the roll 3, are vertically slidably mounted in the frame 14. Between the blocks 24 and 25 and between the blocks 25 and 26 is inserted a vertically-slidable and sidewise-adjustable wedge block 27 or 28, each with its upper and lower surfaces inclined toward each other. The blocks 24, 25 and 26 have their surfaces in contact with the blocks 27 and 28 inclined cooperatively with the surfaces of the blocks 27 and 28. These latter blocks can be adjusted sidewise by screws 29. By moving the block 27 to the right (Fig. 5) the distance between the rolls 1 and 2 will be increased and vice versa, and similarly with the block 28 and rolls 2 and 3. Different diameter gears, to compensate for the difference in distance between the rolls may of course, be substituted as desired. Also the surface speeds of the rolls may be determined as desired. As illustrated, roll 2 has a higher surface speed than roll 3, thereby to refine the stock and also has a higher surface speed than roll 1, thereby to work the stock somewhat into the strands. But, any other feasible speed relation, as equal speeds, may be resorted to by merely changing the gears, as will be understood.

It will be seen that I have provided an apparatus for the production of sheets with strands embedded therein, and more particularly for the production of cord fabric with a set of cords embedded in each face, with the cords of one set staggered with respect to those of the other set, and with which production can be carried on expeditiously and satisfactorily.

Having thus described my invention, I claim:

1. In an apparatus of the character indicated, in combination, a series of cooperating rolls, certain of said rolls being arranged to produce a sheet and certain of said rolls being arranged to receive and pass said sheet therebetween, means to feed a series of strands between one of said latter named rolls and said sheet, means to feed a second series of strands to the other side of said sheet in staggered relation to the first named strands, and means to vary the pressure between said sheet-producing rolls, substantially as described.

2. In an apparatus of the character indicated, in combination, a pair of calender rolls for working out a sheet of rubber between them, a third calender roll for receiving the freshly-worked sheet from the first-named rolls, means for supplying between the sheet and the third roll a series of spaced strands, means for supplying to the other side of the sheet a second series of strands spaced so as to lie opposite the intervals between the first series, and means for pressing both series against and into the freshly-worked sheet.

3. In an apparatus of the character indicated, in combination, a pair of cooperating pressure rolls arranged to receive a sheet of material therebetween, means to feed a series of stands between one of said rolls and one side of said sheet, means cooperating with such roll to press a second series of strands into the other side of said sheet in staggered relation to the first named strands, and means for varying the pressure exerted by said last named means; substantially as described.

4. In an apparatus of the character indicated, in combination, three contiguous and coacting pressure rolls, one contiguous pair of said rolls being adapted to roll stock into sheet form and the other contiguous pair being adapted to press the so-formed sheet therebetween, means to feed a series of strands between said second named pair of rolls and to one side of said sheet, and a roller arranged to feed another series of strands to the other side of said sheet, said roller being arranged in cooperative pressing relation to a roll of said second named pair to feed said second series of strands to said sheet with the strands of such series in staggered relation to the strands of the first said series; substantially as described.

5. In an apparatus of the character indicated, in combination, a pair of contiguous rolls coacting to work out a sheet of rubber between them, a grooved roller constructed and arranged to contact with the freshly-worked sheet to guide thereagainst a series of parallel strands, and means to force the strands into the freshly-worked sheet.

6. In an apparatus of the character indicated, in combination, mechanism for working rubber into sheet form, a smooth surfaced roll arranged to take the freshly-worked stock from said mechanism, and means for supplying to the sheet on said roll a series of spaced parallel strands, said means including a grooved roll arranged sufficiently close to the said smooth surfaced roll to guide the strands so that they will contact with the sheet of rubber in spaced relation substantially corresponding to the spacing of the grooves in the grooved roll.

7. In an apparatus of the character indicated, in combination, three contiguous and coacting smooth calendar rolls, one contiguous pair of said rolls being adapted to roll stock into sheet form and the other contiguous pair being adapted to press the so-formed sheet therebetween, and a roller having circumferential grooves to receive a series of parallel strands and constructed and arranged to guide and press said strands into the rubber sheet on one of said rolls.

8. In an apparatus of the character indicated, in combination, a pair of cooperating smooth calender rolls arranged to receive a sheet of material therebetween, a roller having circumferential grooves to receive a series of parallel strands and cooperating with one of said rolls to press said strands into one side of said sheet, and means for varying the pressure exerted by the grooved roller.

9. In an apparatus of the character indicated, in combination, three contiguous and coacting smooth calender rolls, one contiguous pair of said rolls being adapted to roll stock into sheet form and the other continguous pair being adapted to press the so-formed sheet therebetween, and a roller having circumferential grooves to receive a series of parallel strands and arranged to feed said strands to one side of said sheet, said roller being arranged in cooperative pressing relation to a roll of said second named pair.

10. In an apparatus of the character indicated, in combination, mechanism for working rubber into sheet form and for supporting the sheet so produced, and means for supplying to the sheet as supported a series of parallel strands, said means including a member presenting a curved surface over which the cords pass and arranged substantially in contact with said supporting means.

WILLIAM JAMESON.